United States Patent Office 3,502,777
Patented Mar. 24, 1970

3,502,777
BIOCIDAL AGENTS BASED UPON HEAVY METAL PENTACHLOROPHENOLATES
Rudolf Burkhardt and Rudolf Junghaehnel, Witten (Ruhr), Germany, assignors to Chemische Werke Witten GmbH, Witten (Ruhr), Germany
No Drawing. Filed Nov. 19, 1963, Ser. No. 324,875
Claims priority, application Germany, Jan. 26, 1963, C 29,006
Int. Cl. B27h 3/40
U.S. Cl. 424—289                              14 Claims

ABSTRACT OF THE DISCLOSURE

A preservative composition comprising a colloidal suspension in water of a heavy metal pentachlorophenolate, preferably of copper or zinc. The suspension also contains a surface active compound. The preparation is especially useful for preserving cellulose-containing materials.

---

The strong biocidal effect of pentachlorophenol and the sodium salt thereof has been known for some time. Both products are prepared on a large industrial scale and used, inter alia, as disinfecting agents, herbicides, to kill snails, and for the impregnation of cellulose-containing material for preservative purposes. They are particularly suitable as wood-preserving agents because of their efficacy against wood-damaging fungi and insects, such as termites for example. Depending upon the respective field of application or intended use, either the free pentachlorophenol, which is soluble in most organic solvents, or the easily water-soluble sodium pentachlorophenolate is employed. Both products, however, have the disadvantage that their initially excellent activity or efficacy is of a relatively short duration so that the utilization thereof as preserving agents is considerably impaired. The cause thereof, in the case of the free pentachlorophenol, lies in the volatility of the compound which is considerable even at ambient temperature and, in the case of the sodium pentachlorophenolate, which is only slightly volatile since it is a salt, it resides in the fact that it may be washed out easily because of its great water-solubility.

One of the simplest methods known for transforming or converting pentachlorophenol into derivatives of low volatility and slight water-solubility, thereby prolonging the effective time thereof, is the conversion of the compound into heavy metal salts. Used as heavy metal components are, for example, copper and zinc, the ions of which themselves have a certain biocidal effect also. The salts may be easily prepared, for example by the reaction of sodium pentachlorophenolate with a salt of the corresponding metal in an aqueous solution, whereby they are precipitated as difficulty-soluble salts. While they do possess the desired biocidal effect or activity, they are, on the other hand, not only difficulty-soluble in water but also do not dissolve in the required concentration in the conventional technical solvents. In order to make their utilization possible, it has been attempted to improve their solubility in organic solvents by the admixture of dissolving intermediates. In doing so, however, it is necessary to use either a high quantity of dissolving intermediate in relation to the active substance, or change from the conventional solvents to special solvents, which results, in both instances, in a considerable increase of the cost of the finished solutions.

In another process for applying copper pentachlorophenolate to wood or other cellulose-containing substances, the precipitation of this difficulty-soluble salt from an aqueous solution containing a copper salt and a pentachlorophenol salt is prevented, by the addition of a copper ion complexing agent, for such time until the solution has been applied to the material to be protected. The stability of the copper complex must, therefore, be sufficiently high that a premature precipitation of the copper pentachlorophenolate from the solution is prevented, while, on the other hand, it must be sufficiently low that contact with cellulose effects decomposition of the complex. Such a sensitive or fine adjustment of the stability of the complex can be realized, in actual practice, only with difficulty, since the stability can be shifted in one or the other direction by impurities or changes in the pH value of the water solvent or the surfaces to be treated.

The present invention relates to aqueous biocidal preparations suitable for the preservation of cellulose-containing material utilizing heavy metal pentachlorophenolates as the active substance, in which neither organic solvents, nor the use of complexing compounds is required. The aqueous preparations of heavy metal salts of pentachlorophenol contain the active substance in a colloidal suspension in water and, in addition thereto, contain a surface-active compound. These preparations are easily usable and highly effective biocidal agents.

The active substances employed are preferably copper or zinc pentachlorophenolate, but the biocidal agents may also contain other highly dispersed heavy metal pentachlorophenolates, such as for example, the nickel, cadmium, or lead salts. The content of the active substance may be sufficient only for the intended use, or also may be considerably higher. In the latter case, the agents are concentrates which may be diluted to the desired concentration by mixing with water prior to use.

Such concentrates having an active substance content in the range of about 5 to 15% by weight may be easily prepared and stored for months without any loss of efficiency and dispersibility.

Particularly suited as surface-active compounds are anionic surfactants containing an aliphatic hydrocarbon residue, for example, alkyl sulfonates and alkyl sulfates. Not suitable are substances which may form difficulty-soluble or complex compounds with the heavy metals. The quantity of surfactant contained in the biocidal agents depends upon the quantity of the active substance present. For 1 mole of heavy metal pentachlorophenolate, at least 1 mole, preferably 1.5 to 2.5 moles, of the surfactant should be present.

The application of the biocidal agents of the present invention may be effected in the conventional manner by immersing, coating or, especially with more dilute agents having an active substance content of, for example, 0.1 to 2% by weight, by spraying. For the preservation of wood, dispersions, containing 1 to 3% by weight of active substance are preferably used. The extremely small size of the colloidal particles and the presence of the surfactant make it possible for the active substance to penetrate into the pores of the surfaces to be preserved. Upon the absorption and/or evaporation of the water solvent the colloidal particles coagulate to coarser, water-insoluble heavy metal pentachlorophenolate particles which impart an effective protection to the material treated therewith. As shown in the following examples, the protection afforded is reduced to a much lesser extent by the action of elevated temperatures and/or water than is that afforded by free pentachlorophenol or the sodium salt thereof.

EXAMPLE I

A 2.5% by weight aqueous copper pentachlorophenolate colloidal suspension was tested in comparison with free pentachlorophenol (2.5% by weight solution in mineral spirits) and sodium pentachlorophenolate (2.5% by weight aqueous solution) to determine its effectiveness as a wood-preserving agent against basement fungus (*Coniophora cerebella*) according to the small block process DIN 52,176. The solutions were applied to wooden blocks by a coating process and a third each thereof was subjected to the following preliminary treatments: (a) Exposure to the atmosphere for 4 weeks; (b) soaking for 14 days (to test the susceptibility to leaching of the active substances), and (c) heating at 50° C. in a vacuum of about 10 torr, for 90 hours (to test the volatility of the active substances). The blocks were subsequently placed upon the fungus cultures for 4 months. The loss of weight, considered as a criterion for the attack of fungi has been indicated in percent of the original weight of the blocks in the table of Example II. The values, which are average values from three measurements each, show clearly that the blocks treated with the copper pentachlorophenolate colloidal suspension maintain their protection against the fungus attack after soaking and vacuum treatment at elevated temperature.

The 2.5% by weight copper pentachlorophenolate colloidal suspension was prepared by diluting a 10% by weight concentrate with a three-fold amount of water. The concentrate was obtained by dissolving 90 g. of a 74% by weight sodium alkyl sulfonate, made from the sulfo-chlorination product of a straight-chain, saturated hydrocarbon having an average chain length of 15 carbon atoms, and 50 g. of sodium pentachlorophenolate in 250 ml. of hot water, and mixing the clear solution, which was cooled to 20° C., with a solution of 21 g. of copper sulfate ($CuSO_4 \cdot 5H_2O$) in 93 ml. of water while vigorously stirring.

EXAMPLE II

A 2.5% by weight aqueous zinc pentachlorophenolate colloidal suspension was applied to small wooden blocks, as described in Example I, and the preserving effect against basement fungus was tested. A good protective effect was also still present in this instance, after soaking and also after heating in a vacuum, as is apparent from the following table.

| Active substance | Loss of Weight (in percent) | | |
|---|---|---|---|
| | Exposure to atmosphere | Soaked | Heated at 50° C./ 10 Torr |
| Pentachlorophenol | 0.8 | 13.8 | 28.6 |
| Sodium pentachlorophenolate | 0.8 | 21.8 | 0 |
| Copper pentachlorophenolate | 0.1 | 1.4 | 0 |
| Zinc pentachlorophenolate | 0.5 | 3.5 | 0 |
| Control | 21.8 | 20.8 | 26.0 |

The 2.5% by weight zinc pentachlorophenolate colloidal suspension was prepared by diluting a 12.5% by weight concentrate. The latter was prepared as a white paste by the addition of a solution of 11.5 g. of zinc sulfate ($ZnSO_4 \cdot 7H_2O$) in 40 ml. of water to a solution of 32 g. of an 80% by weight sodium fatty alcohol sulfate (having from 12 to 16 carbon atoms in the alkyl residue) and 24 g. of sodium pentachlorophenolate in 95 ml. of water at 25° C. while vigorously stirring.

It will be obvious to those skilled in the art that many modifications may be made within the scope of the present invention without departing from the spirit thereof, and the invention includes all such modifications.

What is claimed is:
1. A preservative composition consisting essentially of a colloidal suspension of a heavy metal pentachlorophenolate in water and a surfactant, said surfactant being one which forms no difficultly-soluble or complex compounds with said heavy metal.
2. A preservative composition according to claim 1, in which the heavy metal is selected from the group consisting of copper, zinc, nickel, cadmium and lead.
3. A preservative composition according to claim 1 in which the heavy metal is copper.
4. A preservative composition according to claim 1 in which the heavy metal is zinc.
5. A preservative composition according to claim 1 in which the surfactant is an anionic surfactant present in a quantity of about 1 to 4 moles per mole of the heavy metal pentachlorophenolate.
6. A preservative composition according to claim 5, in which said anionic surfactant is selected from the group consisting of alkyl sulfonates and alkyl sulfates.
7. A preservative composition according to claim 1 in which the heavy metal is selected from the group consisting of copper and zinc and the surfactant is anionic.
8. A preservative composition according to claim 7, in which said preservative composition contains about 5 to 15% by weight of said heavy metal pentachlorophenolate.
9. A process for preserving a cellulose-containing material which comprises treating the material with a preservative composition consisting essentially of a colloidal suspension of a heavy metal pentachlorophenolate in water and a surfactant, said surfactant being one which forms no difficultly-soluble or complex compounds with said heavy metal, whereby the composition penetrates the pores of said cellulose-containing material.
10. A process according to claim 9, in which said preservative composition contains from 0.1 to 3% by weight of said heavy metal pentachlorophenolate.
11. A process according to claim 9 in which the surfactant is an anionic surfactant present in a quantity of about 1 to 3 moles per mole of the heavy metal pentachlorophenolate.
12. A process according to claim 9 in which the heavy metal is copper.
13. A process according to claim 9 in which the heavy metal is zinc.
14. A process according to claim 9 in which the heavy metal is selected from the group consisting of copper and zinc and the surfactant is anionic.

References Cited

UNITED STATES PATENTS

| 2,904,466 | 9/1959 | Sakornbut | 117—150 XR |
| 3,239,411 | 3/1966 | Leebrick | 167—30 |
| 3,308,082 | 3/1967 | Pauli et al. | 260—438.1 X |
| 2,901,395 | 8/1959 | Matzinger | 167—42 |

OTHER REFERENCES

Anthony M. Schwartz and James W. Perry, "Surface Active Agents," 495–498, Interscience, New York, 1949.

MORRIS O. WOLK, Primary Examiner

S. MARANTZ, Assistant Examiner

U.S. Cl. X.R.

21—7; 117—150; 424—293, 294, 295